United States Patent
Tagawa et al.

(10) Patent No.: US 11,619,495 B2
(45) Date of Patent: Apr. 4, 2023

(54) POSITION ESTIMATING APPARATUS AND POSITION ESTIMATING METHOD

(71) Applicant: CLARION CO., LTD., Saitama (JP)

(72) Inventors: Shinya Tagawa, Saitama (JP); Arihito Ihara, Ibaraki (JP)

(73) Assignee: CLARION CO., LTD., Saitama (JP)

( * ) Notice: Subject to any disclaimer, the term of this patent is extended or adjusted under 35 U.S.C. 154(b) by 227 days.

(21) Appl. No.: 17/122,047

(22) Filed: Dec. 15, 2020

(65) Prior Publication Data

US 2021/0190509 A1 Jun. 24, 2021

(30) Foreign Application Priority Data

Dec. 23, 2019 (JP) .............................. JP2019-231769

(51) Int. Cl.
*G01C 21/30* (2006.01)
*G05D 1/02* (2020.01)

(52) U.S. Cl.
CPC .......... *G01C 21/30* (2013.01); *G05D 1/0274* (2013.01)

(58) Field of Classification Search
CPC .. G05D 1/0274; G05D 1/0272; G05D 1/0278; G05D 1/0238; G05D 1/0253; G01C 21/32; G01C 21/30; G01C 21/20; G01C 21/206; G01C 21/005; G01C 21/28
See application file for complete search history.

(56) References Cited

U.S. PATENT DOCUMENTS

| | | | |
|---|---|---|---|
| 2008/0319657 A1* | 12/2008 | Gao ..................... | G01C 21/30 |
| | | | 701/532 |
| 2018/0328742 A1* | 11/2018 | Asai ..................... | G06V 20/56 |
| 2019/0033082 A1 | 1/2019 | Asai | |
| 2021/0149409 A1* | 5/2021 | Honsel ................ | G01S 13/867 |

FOREIGN PATENT DOCUMENTS

WO 2017/037753 A1 3/2017

* cited by examiner

*Primary Examiner* — Abby Y Lin
*Assistant Examiner* — Dylan M Katz
(74) *Attorney, Agent, or Firm* — IP Business Solutions, LLC (57) ABSTRACT

A position estimating apparatus including: a position estimating unit that compares a target in first coordinate system data indicating a position of the target by coordinates in a first coordinate system and a target in second coordinate system data indicating a position of the target present around a position estimation object by coordinates in a second coordinate system set based on a position and an attitude of the position estimation object at a predetermined starting timing, and estimates a position of the position estimation object in the first coordinate system based on a comparison result; and a comparison range adjusting unit that shrinks a coordinate range used for the comparison by the position estimating unit in the second coordinate system data when the position estimation object is turning.

3 Claims, 7 Drawing Sheets

POSITION ESTIMATING APPARATUS AND POSITION ESTIMATING METHOD

INCORPORATION BY REFERENCE

The present application claims priority under 35 U.S.C. § 119 to Japanese Patent Application No. 2019-231769 filed on Dec. 23, 2019. The content of the application is incorporated herein by reference in its entirety.

BACKGROUND OF THE INVENTION

Field of the Invention

The present invention relates to a position estimating apparatus and a position estimating method.

Description of the Related Art

International Publication No. WO 2017/037753 discloses a technique for estimating the self-position of a vehicle. International Publication No. WO 2017/037753 discloses "The position of a target present around a vehicle is detected, and the amount of movement of the vehicle is detected, to store the position of the target as target position data based on the amount of movement. Also, part of the target position data is grouped according to the turning state of the vehicle, and an adjustment range of the group is set based on the amount of movement of the vehicle when the target position data is detected. Further, map information including the position of the target is acquired, and the self-position of the vehicle is estimated by comparing the target position data and the position of the target in the map information based on the set adjustment range."

In the technique in International Publication No. WO 2017/037753, if the adjustment range of each group is not strictly set, the accuracy of the self-position estimation would be lowered. Also, when the vehicle turns, processes such as grouping and setting of the adjustment range occur, and thus the processing load is increased.

It is an objective of the present invention to provide a position estimating apparatus and a position estimating method that can more easily suppress the lowering in position estimation accuracy at the time of turning.

SUMMARY OF THE INVENTION

An aspect of the present invention is characterized by including: a first coordinate system-data acquiring unit that acquires first coordinate system data indicating a position of a target by coordinates in a first coordinate system; a second coordinate system-data acquiring unit that acquires second coordinate system data indicating a position of a target present around a position estimation object by coordinates in a second coordinate system set based on a position and an attitude of the position estimation object at a predetermined starting timing; a position estimating unit that compares the target in the first coordinate system data and the target in the second coordinate system data, and estimates a position of the position estimation object in the first coordinate system based on a comparison result; and a comparison range adjusting unit that shrinks a target comparison range used for the comparison by the position estimating unit in the second coordinate system data when the position estimation object is turning.

According to an aspect of the present invention, the lowering in position estimation accuracy at the time of turning can be more easily suppressed.

DETAILED DESCRIPTION OF THE PREFERRED EMBODIMENT

The following describes an embodiment of the present invention with reference to the drawings.

Figure 1:
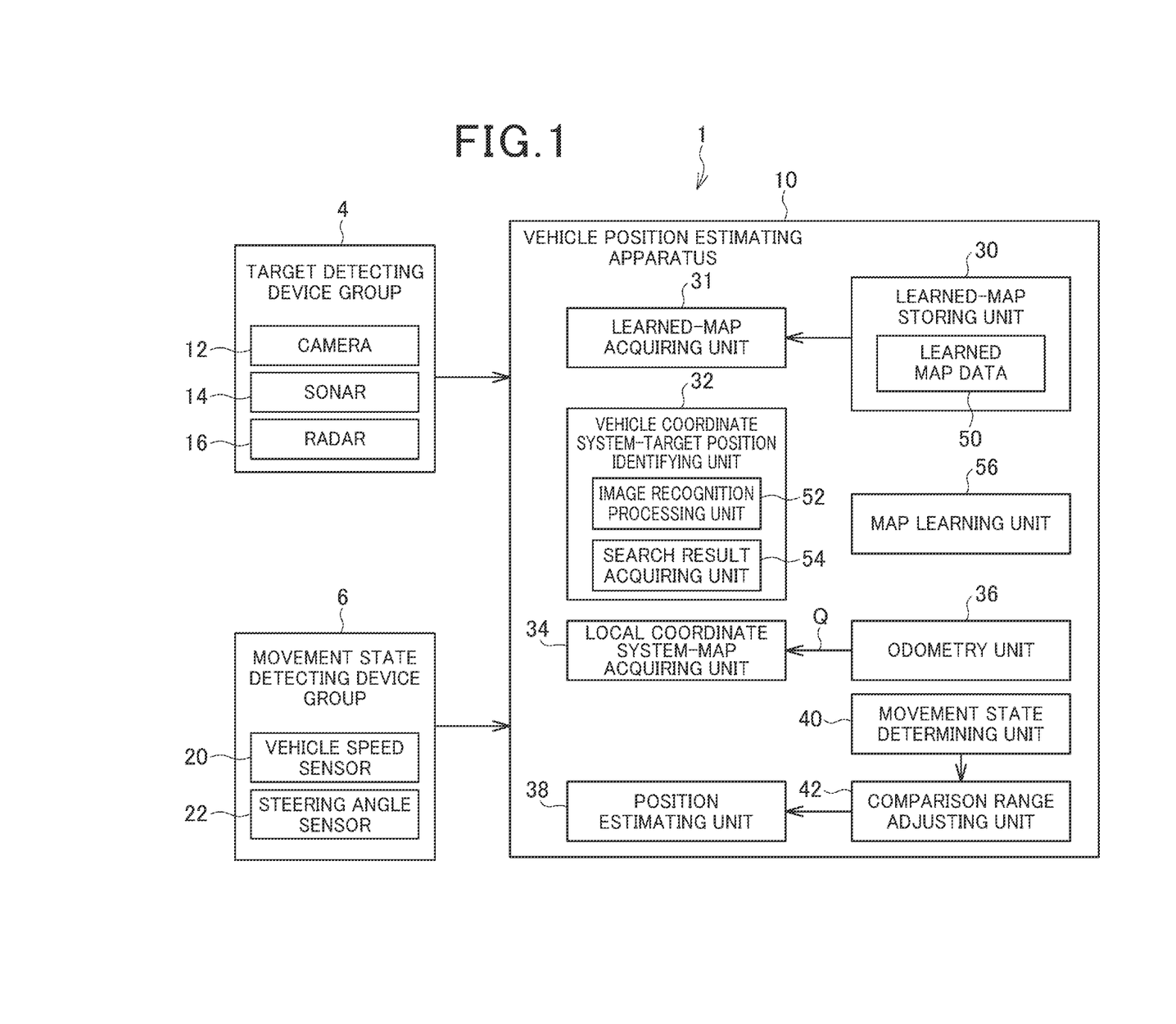
FIG. 1 shows a functional configuration of an in-vehicle system according to an embodiment of the present invention.

FIG. 1 shows a functional configuration of an in-vehicle system 1 according to the present embodiment.

The in-vehicle system 1 is a system provided in a vehicle 2 (FIG. 2) and includes a target detecting device group 4, a movement state detecting device group 6, and a vehicle position estimating apparatus 10.

The target detecting device group 4 includes one or more target detecting devices for detecting targets present around the vehicle 2, and the movement state detecting device group 6 includes one or more movement state detecting devices for detecting movement states of the vehicle 2. The vehicle position estimating apparatus 10 is an in-vehicle apparatus for estimating the position of the vehicle 2 in which it is provided (hereinafter referred to as the "self-position").

Targets detected by the target detecting device group 4 are any objects detectable by detection devices, excluding moving bodies such as other vehicles and pedestrians. Examples of such targets include various lines painted on the road surface (e.g., lane markers indicating vehicular lanes, parking lines, and the like), obstacles that impede the traveling of the vehicle 2 (e.g., curbs, guardrails, building walls, and the like), etc.

The target detecting device group 4 includes a camera 12, a sonar 14, and a radar 16 as target detecting devices.

The camera 12 is a device for photographing scenes around the vehicle 2, and outputs images obtained by the photographing (hereinafter referred to as "photographed images") to the vehicle position estimating apparatus 10. The vehicle 2 is provided with one or more cameras 12 capable of photographing at least scenes toward the front, rear, left side, and right side (that is, scenes of the entire surroundings).

The sonar 14 is a device for searching for targets around the vehicle by using sound waves, and the radar 16 is a device for searching for targets around the vehicle 2 by using electromagnetic waves. The sonar 14 and the radar 16 output the positions of the targets obtained by the searching to the vehicle position estimating apparatus 10.

Note that any external sensor such as e.g., a laser range scanner can be used as a target detecting device, without limitation to the above-mentioned devices.

The movement states detected by the movement state detecting device group 6 include at least the turning state and the vehicle speed of the vehicle 2, and the movement state detecting device group 6 includes a vehicle speed sensor 20 and a steering angle sensor 22 as movement state detecting devices.

The vehicle speed sensor 20 detects the vehicle speed of the vehicle 2 and outputs it to the vehicle position estimating apparatus 10, and the steering angle sensor 22 detects the steering angle of the vehicle 2 and outputs it to the vehicle position estimating apparatus 10.

The vehicle position estimating apparatus 10 includes a computer unit such as e.g., an ECU (Electronic Control Unit). The computer unit includes a processor such as a CPU or an MPU, a memory device (also referred to as a primary storage device) such as a ROM or a RAM, a storage device (also referred to as an auxiliary storage device) such as an HDD or an SSD, an interface circuit to which various sensors and peripheral devices are connected. The processor executes a computer program stored in the memory device or the storage device so that various functional configurations are implemented in the vehicle position estimating apparatus 10.

Specifically, as a result of the execution of the computer program, the vehicle position estimating apparatus 10 functions as a learned-map storing unit 30, a learned-map acquiring unit 31, a vehicle coordinate system-target position identifying unit 32, a local coordinate system-map acquiring unit 34, an odometry unit 36, a position estimating unit 38, a movement state determining unit 40, and a comparison range adjusting unit 42, as shown in FIG. 1.

Figure 2:
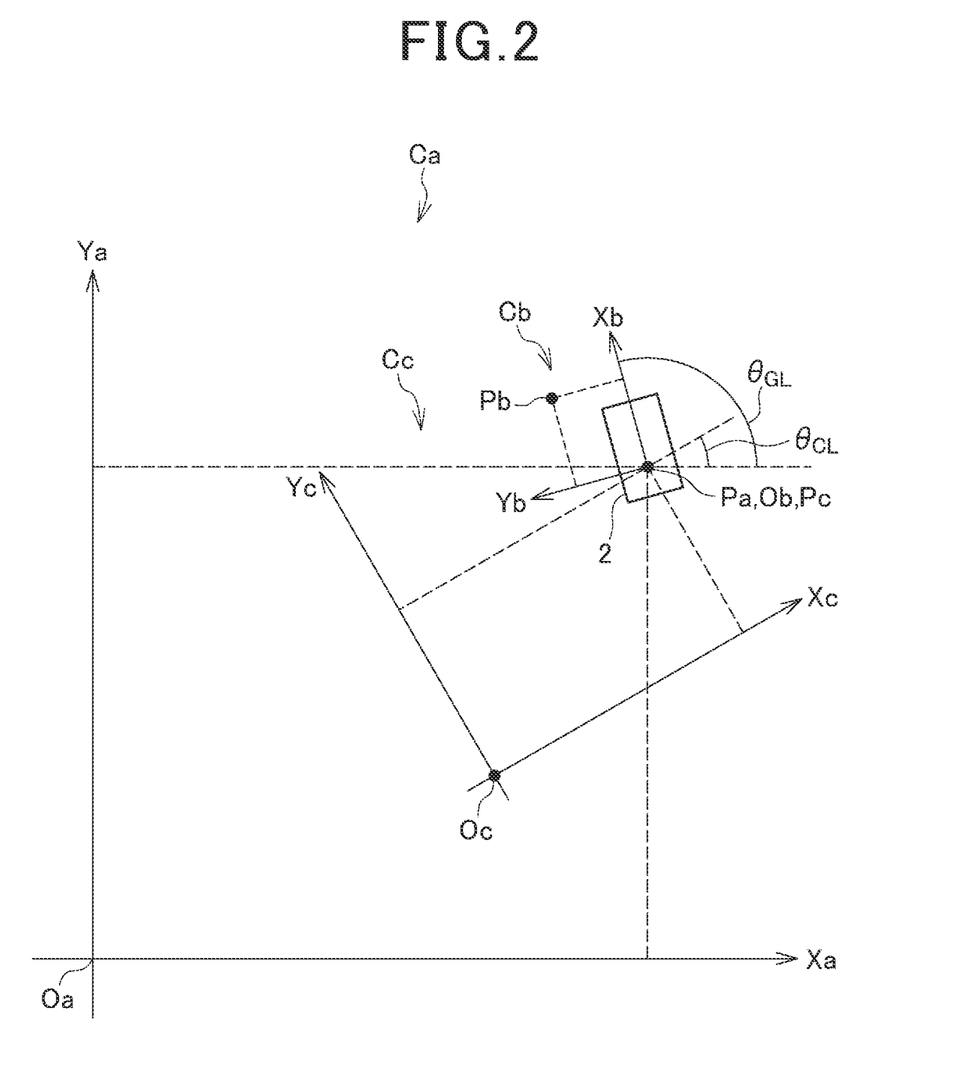
FIG. 2 illustrates a reference coordinate system, a vehicle coordinate system, and a local coordinate system.

FIG. 2 illustrates a reference coordinate system Ca, a vehicle coordinate system Cb, and a local coordinate system Cc.

In the vehicle position estimating apparatus 10 of the present embodiment, the three coordinate systems of the reference coordinate system Ca (a first coordinate system), the vehicle coordinate system Cb, and the local coordinate system Cc (a second coordinate system) are used as coordinate systems for indicating the targets and the self-position of the vehicle 2, as shown in FIG. 2.

The reference coordinate system Ca is a two-dimensional coordinate system for a reference for identifying positions, an origin Oa, an Xa axis, and a Ya axis are set appropriately, and the positions of targets and the vehicle 2 are indicated by reference coordinate system-coordinates Pa.

The vehicle coordinate system Cb is a two-dimensional coordinate system that expresses the positions (relative position) of targets with respect to the position and attitude (orientation of the vehicle body) of the vehicle 2 at a certain timing.

That is, in the vehicle coordinate system Cb, the position of the vehicle 2 at a certain timing is set as an origin Ob, the front-rear direction of the vehicle 2 is set as an Xb axis, and the left-right direction of the vehicle 2 is set as a Yb axis, as shown in FIG. 2. In the reference coordinate system Ca, the vehicle coordinate system Cb moves as if the origin Ob sticks to the vehicle 2, and the directions of the Xb axis and the Yb axis rotate at a rotational angle $\theta$GL corresponding to the orientation of the vehicle body. Note that coordinates in the vehicle coordinate system Cb are hereinafter referred to as vehicle coordinate system-coordinates Pb.

The local coordinate system Cc is a two-dimensional coordinate system in which the position of an origin Oc and the directions of an Xc axis and a Yc axis do not change in the reference coordinate system Ca regardless of the movement and attitude (orientation of the vehicle body) of the vehicle 2, unlike the vehicle coordinate system Cb. That is, the local coordinate system Cc is also a coordinate system in which the origin Oc is positioned at a fixed coordinate point and the Xc axis and the Yc axis are rotated at a constant rotational angle $\theta$CL ($\theta$CL may be zero) in the reference coordinate system Ca.

In the present embodiment, the local coordinate system Cc is set based on the position and attitude of the vehicle 2 at a predetermined starting timing T0. The starting timing T0 is an appropriate timing at least before the first target detection timing Ta, and in the present embodiment, a timing when the engine of the vehicle 2 is started is used as the starting timing T0. Note that coordinates in the local coordinate system Cc are hereinafter referred to as local coordinate system-coordinates Pc.

Returning to FIG. 1 above, the learned-map storing unit 30 prestores learned map data 50. The learned map data 50 is prepared data that records in advance the positions of targets (such as curbs and lane markers indicating vehicular lanes) present on the route traveled by the vehicle 2 and in its surroundings in the reference coordinate system Ca, and is map data used as a reference for position estimation. The learned map data 50 is generated based on local coordinate system-map data 58, which will be described later.

The learned-map acquiring unit 31 reads out and acquires the learned map data 50 from the learned-map storing unit 30 and outputs it to the position estimating unit 38. Note that the learned-map acquiring unit 31 may acquire the learned map data 50 from another apparatus different from the vehicle position estimating apparatus 10. The another apparatus includes an appropriate storage device provided in the in-vehicle system 1, a computer external to the vehicle 2 and communicatively connected via a telecommunication line, and the like.

At every predetermined target detection timing Ta, the vehicle coordinate system-target position identifying unit 32 identifies the positions of targets that are present around the vehicle 2 at that time based on input signals from the target detecting device group 4. These positions use the vehicle coordinate system Cb mentioned above.

The vehicle coordinate system-target position identifying unit 32 includes an image recognition processing unit 52 and a search result acquiring unit 54, the image recognition processing unit 52 identifies vehicle coordinate system-coordinates Pb indicating the positions of targets by performing image recognition on a photographed image of the camera 12, and the search result acquiring unit 54 identifies vehicle coordinate system-coordinates Pb indicating the positions of targets based on search results of the sonar 14 and the radar 16.

Note that an appropriate recognition technique that is publicly or widely known and capable of recognizing targets appearing in photographed images can be used for the image recognition of the image recognition processing unit 52. Also, internal parameters such as the focal length and image sensor size of the camera 12 and external parameters that are the position and attitude at which the camera 12 is attached to the vehicle 2 are prestored in the memory device such as the ROM, and the image recognition processing unit 52 calculates the positional relationship between targets appearing in a photographed image and the camera 12 (that is, the positions of the targets relative to the vehicle 2) by using these internal parameters and external parameters.

Also, a conversion equation for converting the positions of targets indicated by search results of the sonar 14 and the radar 16 into vehicle coordinate system-coordinates Pb in the vehicle coordinate system Cb is calculated in advance, and the search result acquiring unit 54 identifies the vehicle coordinate system-coordinates Pb of the targets by using the conversion equation.

The vehicle coordinate system-coordinates Pb of the targets identified by the vehicle coordinate system-target position identifying unit 32 are sequentially stored in the memory device such as e.g., the RAM.

The local coordinate system-map acquiring unit 34 acquires local coordinate system-map data 58 (FIG. 5) by generating the local coordinate system-map data 58 based on the vehicle coordinate system-coordinates Pb of the targets identified by the vehicle coordinate system-target position identifying unit 32 and odometry information Q of the vehicle 2.

Figure 5:
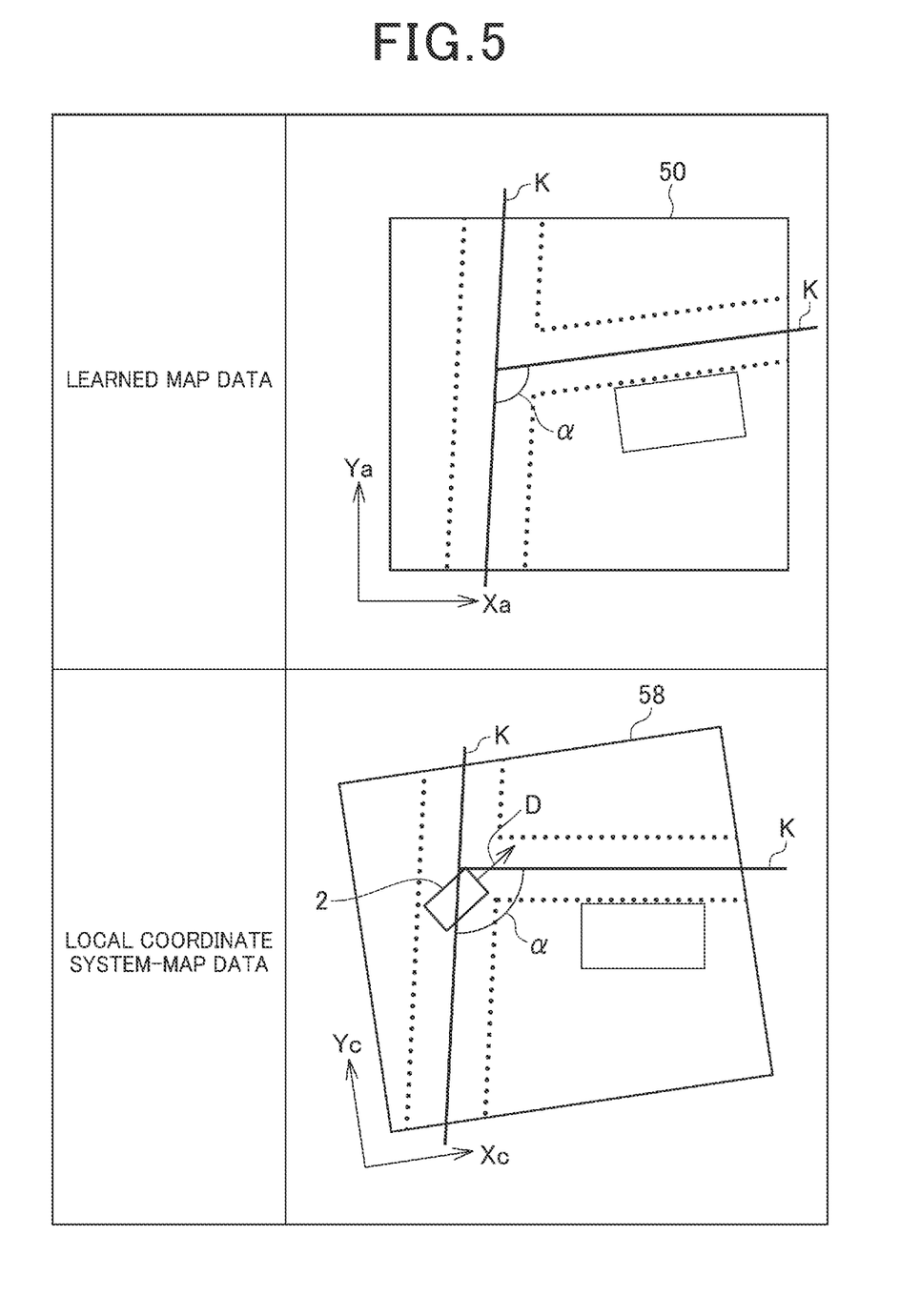
FIG. 5 schematically shows an example of learned map data and local coordinate system-map data.

The local coordinate system-map data 58 is data including the individual positions of the targets identified by the vehicle coordinate system-target position identifying unit 32 at one or more target detection timings Ta by that point of time. These positions are indicated by local coordinate system-coordinates Pc of the local coordinate system Cc. That is, the local coordinate system-map data 58 is temporary data generated by using the above-mentioned starting timing T0, at which the local coordinate system Cc is set, as the starting point.

Figure 3:
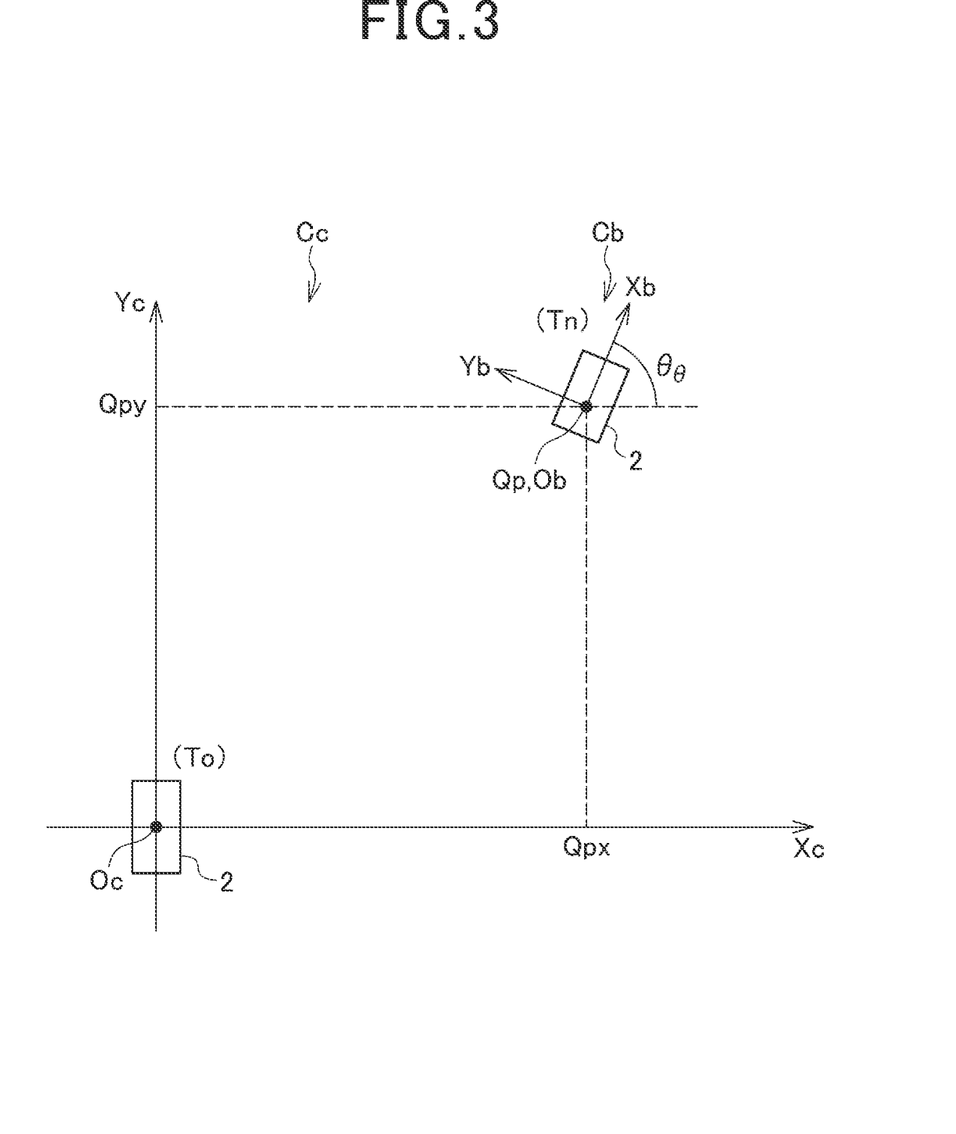
FIG. 3 illustrates odometry information.

FIG. 3 illustrates odometry information Q.

The odometry information Q is information indicating a position Qp and a rotational angle Qθ of the vehicle 2 at a certain timing Tn by using the local coordinate system Cc, as shown in FIG. 3.

The position Qp of the vehicle 2 corresponds to the origin Ob of the vehicle coordinate system Cb at the certain timing Tn, and the rotational angle Qθ corresponds to the rotational angle of the Xb axis and Yb axis of the vehicle coordinate system Cb in the local coordinate system Cc. That is, vehicle coordinate system-coordinates Pb of the vehicle coordinate system Cb, which vary for each target detection timing Ta, can be converted into local coordinate system-coordinates Pc of the local coordinate system Cc by using the odometry information Q at the corresponding target detection timing Ta.

To acquire the local coordinate system-map data 58 by generation, the local coordinate system-map acquiring unit 34 converts the vehicle coordinate system-coordinates Pb of each target identified by the vehicle coordinate system-target position identifying unit 32 into local coordinate system-coordinates Pc by using the odometry information Q when the target is identified. As a result of this conversion, the local coordinate system-map data 58 can be obtained in which the targets in the vehicle coordinate system Cb that are different from each other are mapped to the local coordinate system Cc, which is unique to the vehicle 2.

Note that the generation of the local coordinate system-map data 58 may be performed every time the vehicle coordinate system-coordinates Pb of the targets are identified by the vehicle coordinate system-target position identifying unit 32 (that is, at every target detection timing Ta), or may be collectively performed for the targets identified at each target detection timing Ta after a plurality of target detection timings Ta.

Returning to FIG. 1, the odometry unit 36 identifies the above-mentioned odometry information Q in synchronization with the target detection timing Ta and outputs it to the local coordinate system-map acquiring unit 34.

Specifically, the odometry unit 36 calculates the position Qp and the rotational angle Qθ of the vehicle body of the vehicle 2 at the present point of time in the local coordinate system Cc by accumulating the vehicle speeds sequentially detected by the vehicle speed sensor 20 and the steering angles sequentially detected by the steering angle sensor 22 from the above-mentioned starting timing T0 to the present point of time.

Note that an appropriate dead reckoning technique that is widely or publicly known can be used for calculating the odometry information Q from the vehicle speeds and the steering angles.

The position estimating unit 38 performs comparison (also referred to as "matching") of common targets recorded in both of the local coordinate system-map data 58 acquired by the local coordinate system-map acquiring unit 34 and the learned map data 50 acquired by the learned-map acquiring unit 31. Then, the position estimating unit 38 uses a comparison result to identify reference coordinate system-coordinates Pa corresponding to the current position of the vehicle 2 (i.e., the origin Ob) in the reference coordinate system Ca in the learned map data 50. Those reference coordinate system-coordinates Pa are an estimation result of the self-position of the vehicle 2.

The movement state determining unit 40 and the comparison range adjusting unit 42 are functional components provided for enhancing the accuracy of the position estimation by the position estimating unit 38 at the time of turning of the vehicle 2.

The movement state determining unit 40 determines the turning and the vehicle speed of the vehicle 2 based on a detection result of the movement state detecting device group 6. The turning of the vehicle 2 is determined based on the steering angle, and it is determined that the vehicle 2 is in a turning state if the steering angle is greater than or equal to a predetermined angle (e.g., 90 degrees).

The comparison range adjusting unit 42 adjusts a coordinate range used for the comparison with the learned map data 50 in the local coordinate system-map data 58 (hereinafter referred to as a "comparison coordinate range" with a reference character Gf) based on the movement states of the vehicle 2.

Specifically, when the vehicle 2 is turning, the comparison range adjusting unit 42 limits and shrinks the comparison coordinate range Gf to a range forward of the vehicle 2 in a traveling direction D (FIG. 5 and FIG. 6) in the coordinate range recorded in the local coordinate system-map data 58. Also, when the turning of the vehicle 2 ends, the comparison range adjusting unit 42 removes the limitation of the comparison coordinate range Gf to restore it to the range before the limitation. During this removal, the comparison range adjusting unit 42 gradually extends the comparison coordinate range Gf by a degree corresponding to the vehicle speed of the vehicle 2.

Figure 4:
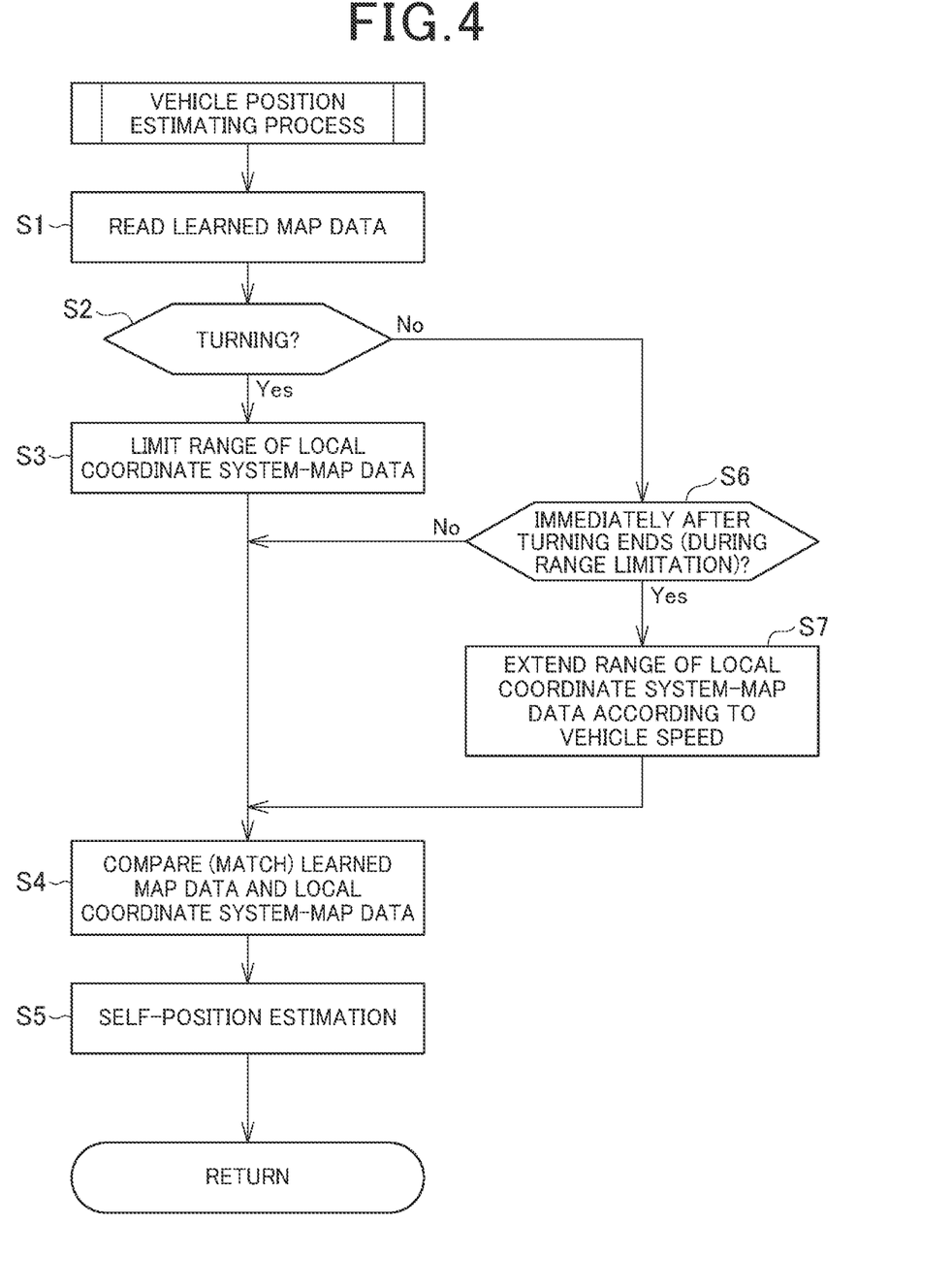
FIG. 4 is a flow chart of a vehicle position estimating process performed by a vehicle position estimating apparatus.

FIG. 4 is a flow chart of a self-position estimating process performed by the vehicle position estimating apparatus 10.

The self-position estimating process is a process for estimating the self-position of the vehicle 2, and is performed one or more times at appropriate timings when self-position estimation using a dead reckoning technique is needed. Such a timing includes a timing for estimating the self-position using the dead reckoning technique when the vehicle 2 travels in a tunnel, in which it is hard to receive the electromagnetic waves of GNSS (Global Navigation Satellite System), for example, and a timing for estimating the self-position using the dead reckoning technique when vehicle control with a higher position-measurement resolution than the GNSS (e.g., autonomous driving control) is needed, for example, and the like.

Also, as described above, in the vehicle position estimating apparatus 10, the local coordinate system-map acquiring unit 34 acquires the local coordinate system-map data 58 by sequentially generating it from the starting timing T0 (in the present embodiment, when the engine of the vehicle 2 is started), and the local coordinate system-map data 58 is sequentially updated and recorded in the memory device such as the RAM.

As shown in FIG. 4, when the vehicle position estimating apparatus 10 estimates the self-position of the vehicle 2, the learned map data 50 is read by the position estimating unit 38 (step S1), and the position estimating unit 38 performs comparison (matching) of the learned map data 50 and the local coordinate system-map data 58. During the comparison, the comparison range adjusting unit 42 first adjusts the comparison coordinate range Gf of the local coordinate system-map data 58 based on the movement states of the vehicle 2 at that point of time.

Specifically, if the movement state determining unit 40 determines that the vehicle 2 is turning (step S2: Yes), the comparison range adjusting unit 42 shrinks the comparison coordinate range Gf of the local coordinate system-map data 58 by limiting the comparison coordinate range Gf to a range forward of the vehicle 2 at the present point of time in the traveling direction D (step S3).

The position estimating unit 38 compares common targets recorded in both of the comparison coordinate range Gf of the local coordinate system-map data 58 and the learned map data 50 (step S4), and estimates the self-position of the vehicle 2 in the reference coordinate system Ca based on the comparison result (step S5).

FIG. 5 schematically shows an example of the learned map data 50 and the local coordinate system-map data 58. The figure shows the learned map data 50 and the local coordinate system-map data 58 in which the positions of targets (such as e.g., curbs and white lines) around a T-junction are recorded. Also, in the figure, lines indicating road axes K of the T-junction and a rectangle indicating the vehicle 2 are each shown for convenience of easy understanding and are not recorded in the learned map data 50 and the local coordinate system-map data 58.

In the vehicle position estimating apparatus 10 of the present embodiment, reference data that predefines the relationship between the steering angle and the rotational angle $Q\theta$ is stored in the memory device or storage device, and when it is determined by the movement state determining unit 40 that the vehicle 2 is turning, the odometry unit 36 references the reference data and identifies the rotational angle $Q\theta$ of the vehicle 2 based on the steering angle of the vehicle 2.

However, at the time of turning, the odometry information Q, which is obtained by dead reckoning, is prone to have errors in the rotational angle $Q\theta$ and the position of the vehicle 2 due to various factors such as the accuracy of the reference data, the individual variation of the vehicle 2, and the sliding of the vehicle body at the time of turning. Due to these errors, errors in the positions of the targets recorded in the local coordinate system-map data 58 occur, and inconsistencies from the positions of the targets in the learned map data 50 occur. For example, in the example of FIG. 5, errors in the targets at the periphery of the Y-junction occur, and an inconsistency in the angle α formed by the individual road axes K of the Y-junction occurs. When the comparison in step S4 above is performed while this inconsistency occurs, the accuracy of the comparison is lowered, and as a result the accuracy of the self-position estimation in step S5 is lowered.

Figure 6:
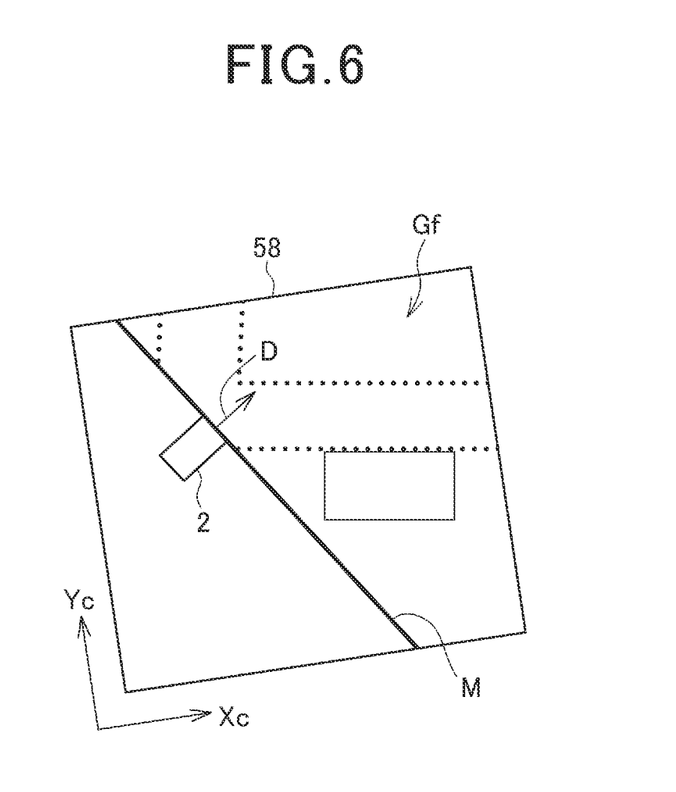
FIG. 6 schematically shows an example of the local coordinate system-map data in which a comparison coordinate range is limited.

In the present embodiment, as described above, when it is determined by the movement state determining unit 40 that the vehicle 2 is turning (step S2: Yes), the comparison coordinate range Gf of the local coordinate system-map data 58 is limited and shrunk to a range forward of the vehicle 2 in the traveling direction D, as shown in FIG. 6. As a result of this limitation, only the targets that are present in the coordinate range forward of the vehicle 2 in the traveling direction D in the local coordinate system-map data 58 are used for the comparison with the learned map data 50, and therefore errors in the comparison of them can be made less prone to occur, and the lowering in the accuracy of the self-position estimation can be suppressed.

Also, since the comparison coordinate range Gf of the local coordinate system-map data 58 is set to the range that the vehicle 2 subsequently enters (the range forward in the traveling direction D) instead of a range opposite to the traveling direction D of the vehicle 2, that is, a range through which the vehicle 2 have already passed, the accuracy of the self-position estimation in the region that will be entered can be maintained even when the comparison coordinate range Gf is shrunk.

Note that, when the comparison coordinate range Gf is limited, a boundary M (FIG. 6) of the limitation is defined with respect to the vehicle 2. In this case, the boundary M may be defined to cross the vehicle 2, or may be defined to extend outside the vehicle 2.

Returning to FIG. 4 above, when it is determined by the movement state determining unit 40 that the vehicle 2 is not turning (step S2: No) but it is immediately after turning ends (step S6: Yes), that is, when the comparison coordinate range Gf in the local coordinate system-map data 58 is shrunk as compared to before the limitation, the comparison range adjusting unit 42 extends the comparison coordinate range Gf in the direction opposite to the traveling direction D of the vehicle 2 by a degree corresponding to the vehicle speed within the limit of the size of the comparison coordinate range Gf before the limitation (step S7).

Figure 7:
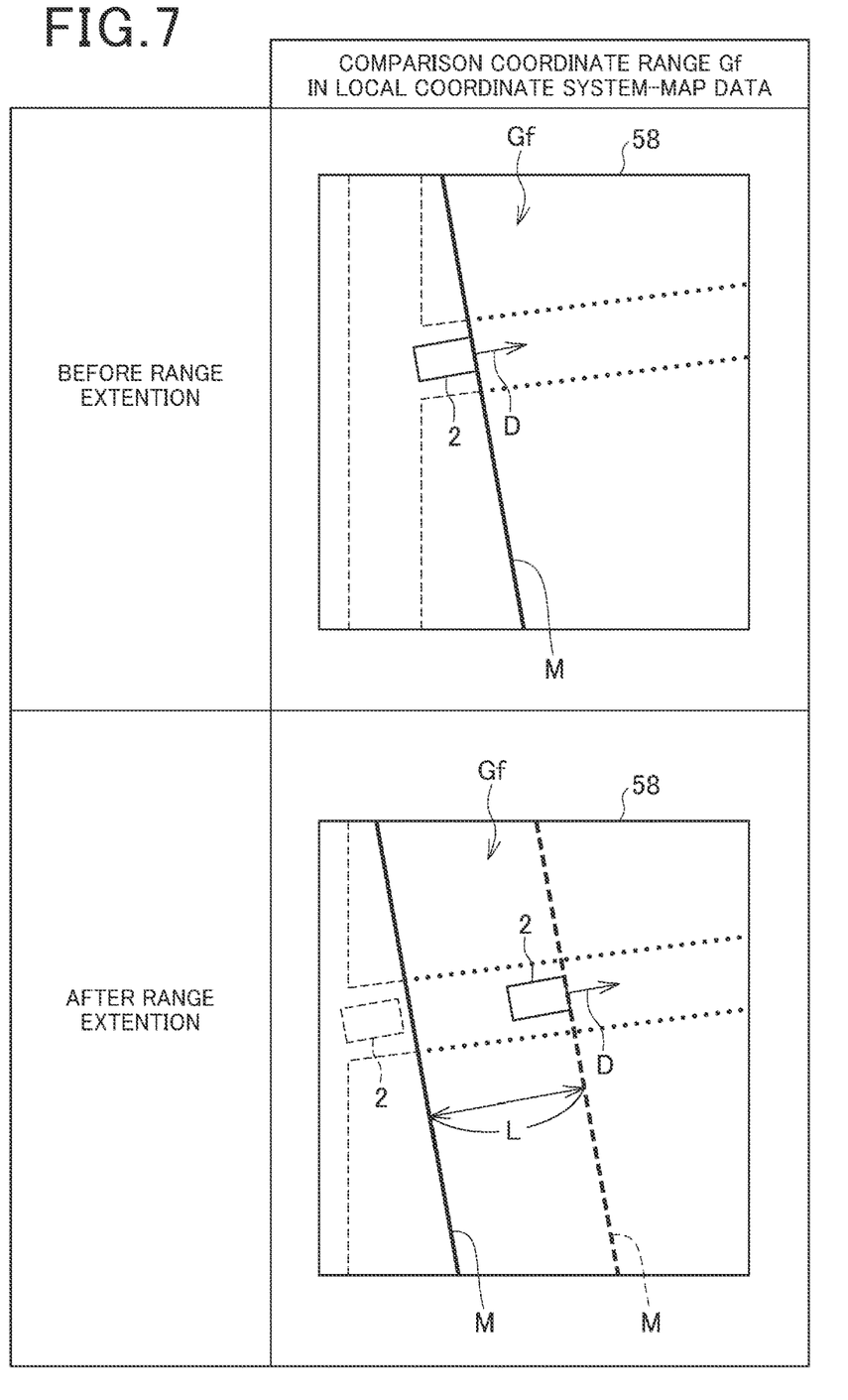
FIG. 7 illustrates an operation of extending the comparison coordinate range in the local coordinate system-map data.

More specifically, the comparison range adjusting unit 42 extends the comparison coordinate range Gf by moving the boundary M in the direction opposite to the traveling direction D from the position immediately after the turning ends by a distance L corresponding to the vehicle speed, as shown in FIG. 7.

The position estimating unit 38 compares common targets recorded in both of the extended comparison coordinate range Gf in the local coordinate system-map data 58 and the learned map data 50 (step S4), and estimates the self-position of the vehicle 2 in the reference coordinate system Ca based on the comparison result (step S5).

Thus, the comparison coordinate range Gf is not restored to the original range at one time immediately after turning ends, and this prevents the lowering in the self-position estimation accuracy due to errors included in the odometry information Q at the time of turning immediately after the turning ends.

Here, the faster the vehicle speed after the turning ends is, the larger the travel distance of the vehicle 2 per unit time is. In this case, if the comparison coordinate range Gf is extended by constant amounts with respect to the vehicle 2, the size of the comparison coordinate range Gf may be insufficient relative to the travel distance of the vehicle 2.

In contrast, in the present embodiment, since the comparison coordinate range Gf is gradually extended by a degree corresponding to the vehicle speed after turning of the vehicle 2, the size of the comparison coordinate range Gf can be made sufficient and appropriate to the speed and travel distance of the vehicle 2, and the lowering in the self-position estimation accuracy can be prevented. Note that, instead of the vehicle speed, the travel distance may be used when extending the comparison coordinate range Gf.

Note that, in the self-position estimating process shown in FIG. 4, when it is determined by the movement state determining unit 40 that the vehicle 2 is not turning (step S2: No) and it is not immediately after turning ends (step S6: Yes), the position estimating unit 38 compares the local coordinate system-map data 58 and the learned map data 50 (step S4) without the limitation of the comparison coordinate range Gf by the comparison range adjusting unit 42, and estimates the self-position (step S5).

The vehicle position estimating apparatus 10 performs a process of learning the learned map data 50 based on the local coordinate system-map data 58 at an appropriate timing after the self-position estimating process.

Specifically, the vehicle position estimating apparatus 10 includes a map learning unit 56 (FIG. 1) for learning the learned map data 50, and the map learning unit 56 learns the learned map data 50 by updating it based on the local coordinate system-map data 58 at an appropriate timing. In this learning, the map learning unit 56 updates the learned map data 50 by the local coordinate system-map data 58 when a result of comparison between the local coordinate system-map data 58 and the learned map data 50 indicates that a consistency between them is greater than or equal to a predetermined value. Also, if learned map data 50 of the area indicated by the local coordinate system-map data 58 is not stored in the learned-map storing unit 30, the map learning unit 56 learns a map of the area by adding the local coordinate system-map data 58 of the area to the learned map data 50.

The above-described embodiment has the following effects.

In the present embodiment, the vehicle position estimating apparatus 10 includes the comparison range adjusting unit 42 that shrinks the comparison coordinate range Gf used for comparison by the position estimating unit 38 in the local coordinate system-map data 58 when the vehicle 2 is turning.

In this manner, only the targets that are present in the shrunk coordinate range in the local coordinate system-map data 58 are used for the comparison with the learned map data 50, and therefore errors in the comparison can be made less prone to occur, and the lowering in the accuracy of the self-position estimation can be suppressed.

In the present embodiment, the comparison range adjusting unit 42 shrinks the comparison coordinate range Gf by limiting the comparison coordinate range Gf to a range forward of the vehicle 2 in the traveling direction D.

In this manner, even when the comparison coordinate range Gf is shrunk, the accuracy of the self-position estimation in the region that the vehicle 2 will enter can be maintained.

In the present embodiment, the comparison range adjusting unit 42 gradually extends the comparison coordinate range Gf for restoring the comparison coordinate range Gf after turning ends. In this manner, the comparison coordinate range Gf is not restored to the range before the limitation at one time immediately after the turning ends, and the effect of errors included in the odometry information Q at the time of turning is not increased, so that the lowering in the self-position estimation accuracy is suppressed.

In the present embodiment, the comparison range adjusting unit 42 gradually extends the comparison coordinate range Gf by a degree corresponding to the speed of the vehicle 2. The size of the comparison coordinate range Gf can be made sufficient and appropriate to the speed of the vehicle 2, and the lowering in the self-position estimation accuracy can be prevented.

The above-described embodiment merely illustrates a mode of embodying the present invention, and any modifications and applications are possible without departing from the spirit of the present invention.

Although the local coordinate system-map acquiring unit 34 acquires the local coordinate system-map data 58 by generating it in the above-described embodiment, there is no limitation thereto. That is, the local coordinate system-map acquiring unit 34 may acquire the local coordinate system-map data 58 from another apparatus different from the vehicle position estimating apparatus 10.

Although a coordinate system set in the vehicle 2 is used as the reference coordinate system Ca in the above-described embodiment, there is no limitation thereto, and it may be a coordinate system such as a geographic coordinate system (i.e., a coordinate system that does not depend on the vehicle 2).

The functional blocks shown in FIG. 1 are schematic diagrams showing the components of the in-vehicle system and the vehicle position estimating apparatus by grouping them according to the main processing operation for easy understanding of the invention of present application, and these components can be grouped into more component according to the processing operation. Also, the grouping can be done such that one component performs more processes.

The present invention can be applied to self-position estimation using any moving body as the position estimation object without limitation to a vehicle.

REFERENCE SIGNS LIST

1 in-vehicle system
2 vehicle
4 target detecting device group
6 movement state detecting device group
10 vehicle position estimating apparatus (position estimating apparatus)
20 vehicle speed sensor
22 steering angle sensor
31 learned-map acquiring unit (first coordinate system-data acquiring unit)
34 local coordinate system-map acquiring unit (second coordinate system-data acquiring unit)
36 odometry unit
38 position estimating unit
40 movement state determining unit
42 comparison range adjusting unit
50 learned map data (first coordinate system data)
58 local coordinate system-map data (second coordinate system data)
Ca reference coordinate system (first coordinate system)
Cb vehicle coordinate system
Cc local coordinate system (second coordinate system)
D traveling direction
Gf comparison coordinate range (coordinate range)
Q odometry information

What is claimed is:
1. A position estimating apparatus comprising: a processor operating as a control unit, wherein the processor includes:

a first coordinate system-data acquiring unit configured to acquire first coordinate system data indicating a position of a target by coordinates in a first coordinate system;

a second coordinate system-data acquiring unit configured to acquire second coordinate system data indicating a position of a target present around a position estimation object by coordinates in a second coordinate system set based on a position and an attitude of the position estimation object at a predetermined starting timing;

a position estimating unit configured to compare the target in the first coordinate system data and the target in the second coordinate system data, and estimates a position of the position estimation object in the first coordinate system based on a comparison result; and a comparison range adjusting unit configured to shrink a coordinate range used for the comparison by the position estimating unit in the second coordinate system data when the position estimation object is turning, wherein the comparison range adjusting unit limits the coordinate range to a range forward of the position estimation object in a traveling direction of the position estimation object, wherein the control unit controls the position estimation object based on the estimated position.

2. A position estimating apparatus comprising: a processor operating as a control unit, wherein the processor includes:

a first coordinate system-data acquiring unit configured to acquire first coordinate system data indicating a position of a target by coordinates in a first coordinate system;

a second coordinate system-data acquiring unit configured to acquire second coordinate system data indicating a position of a target present around a position estimation object by coordinates in a second coordinate system set based on a position and an attitude of the position estimation object at a predetermined starting timing;

a position estimating unit configured to compare the target in the first coordinate system data and the target in the second coordinate system data, and estimates a position of the position estimation object in the first coordinate system based on a comparison result; and a comparison range adjusting unit configured to shrink a coordinate range used for the comparison by the position estimating unit in the second coordinate system data when the position estimation object is turning, wherein the comparison range adjusting unit extends the coordinate range by a degree corresponding to a speed of the position estimation object, when restoring the coordinate range after the turning ends, wherein the control unit controls the position estimation object based on the estimated position.

3. A position estimating method performed by a position estimating apparatus including a processor and estimating a position of a position estimation object, the position estimating method comprising the steps of:

acquiring first coordinate system data indicating a position of a target by coordinates in a first coordinate system;

acquiring second coordinate system data indicating a position of a target present around a position estimation object by coordinates in a second coordinate system set based on a position and an attitude of the position estimation object at a predetermined starting timing;

comparing the target in the first coordinate system data and the target in the second coordinate system data, and estimates a position of the position estimation object in the first coordinate system based on a comparison result; and controlling the position estimation object based on the estimated position, wherein in the step of comparing, the position estimating apparatus shrinks a coordinate range used for the comparison in the second coordinate system data when the position estimation object is turning, and the coordinate range is limited to a range forward of the position estimation object in a traveling direction of the position estimation object.

* * * * *